United States Patent
Uehran

(10) Patent No.: US 8,054,174 B1
(45) Date of Patent: Nov. 8, 2011

(54) REFEREE'S WIRELESS HORN INDICATOR SYSTEM HAVING SENSOR ALERTS

(75) Inventor: Randy S. Uehran, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 265 days.

(21) Appl. No.: 12/322,985

(22) Filed: Feb. 10, 2009

(51) Int. Cl.
*G08B 1/08* (2006.01)
*A63B 69/00* (2006.01)
*H04B 3/36* (2006.01)
*A63F 7/20* (2006.01)

(52) U.S. Cl. ........... 340/539.11; 340/539.1; 340/323 R; 340/407.1; 340/309.16; 340/7.6; 368/1; 368/10; 368/244; 273/DIG. 26; 273/317.3

(58) Field of Classification Search .............. 340/539.11
See application file for complete search history.

(56) References Cited

U.S. PATENT DOCUMENTS

| | | | | |
|---|---|---|---|---|
| 4,637,732 A | * | 1/1987 | Jones et al. | 368/109 |
| 6,603,711 B2 | * | 8/2003 | Calace | 368/109 |
| 6,816,442 B1 | * | 11/2004 | Heiman et al. | 368/107 |
| 7,031,225 B2 | * | 4/2006 | McDonald | 368/10 |
| 7,218,216 B1 | * | 5/2007 | Uehran | 340/517 |

* cited by examiner

*Primary Examiner* — Donnie Crosland
(74) *Attorney, Agent, or Firm* — Schwegman, Lundberg & Woessner, P.A.

(57) ABSTRACT

A referee's wireless horn indicator system having sensory alerts for aiding a referee in accurately officiating a sports event. The system includes a controller and a sensory receiver. The controller includes an official time clock for the sports event, a control circuit coupled to the official time clock, and a radio transmitter activated by a control circuit for sending a radio signal including time information to the sensory receiver. The sensory receiver is worn by the referee, for instance, on the wrist and includes a radio receiver and a sensory alerting device, such as a piezoelectronic speaker and a vibrator, where such sensory receiver is battery powered. Prior to and/or upon the official time clock reaching zero, a time signal is sent by the transmitter to the radio receiver which interprets and then activates one or more of the selected and configured sensory alert devices to impart an audible sensory alert or a tactual sensory (vibratory) alert, or both, to the referee thereby apprising the referee of the time remaining in or of the expiration of the time period or game, or both.

13 Claims, 1 Drawing Sheet

REFEREE'S WIRELESS HORN INDICATOR SYSTEM HAVING SENSOR ALERTS

CROSS REFERENCES TO RELATED APPLICATIONS

None.

BACKGROUND OF THE INVENTION

1. Field of the Invention

The present invention is for a referee's wireless horn indicator system having sensory alerts.

2. Description of the Prior Art

Self-contained timing devices which are worn by a sports official and which generate an audible or tactile alert or signal upon expiration of a predetermined time period in a sports event are known; however, all such known devices are independent of the official timepiece incorporated for determining the end of such time period and thus frequently lead to time discrepancies due to system inaccuracies. The present invention relates to a device for aiding a sports official, such as a referee, to determine with greatly increased certainty whether or not a particular action occurred before the time clock reached zero. For example, in basketball oftentimes a player is attempting to make a last second shot and the referee must determine if the shot was made prior to the time clock hitting zero. Aside from the difficulty of trying to watch both the athletes and the time clock at the same time, sometimes the crowd is so loud that the buzzer or horn cannot be heard. As a result, the referee may make an incorrect call. The invention solves the problem by providing a referee with a portable, battery operated, radio controlled and linked vibrator sensor receiver, the output and function of which is selectable by the referee, and which is synchronized with and linked to the official time clock. The sensory receiver includes and also provides a visual display, an audible sensory alert or tactual sensory (vibratory) alert or combination thereof to the referee in a countdown fashion prior to the time clock reaching zero and/or upon the time clock reaching zero.

Thus, even though the referee may fail to hear the buzzer or horn, the referee will know from the audible sensory alert or the tactual sensory alert, or both, when the time is nearing expiration, when the time has expired, or both, and, therefore, will be able to make the proper call. The sensory receiver is similar to a paging device in size and operation.

SUMMARY OF THE INVENTION

The general purpose of the present invention is to provide a referee's wireless horn indicator system having sensory alerts.

According to one embodiment of the present invention, there is provided a referee's wireless horn indicator system having sensory alerts, the major components thereof consisting of a portable, battery operated, radio controlled and linked vibrator device, herein called the sensory receiver, and a controller which transmits time information to the sensory receiver. The sensory receiver can be worn at any suitable location on the body of the referee, an example being on the wrist. The controller includes a time display and clock which interfaces with a scoreboard via a control circuit and also includes controlling circuitry, which can be telemetry circuitry, and a transmitter for transmitting essential clock generated time information or optionally other information to the sensory receiver. Prior to or upon the time clock reaching zero, the controller transmits signals to the sensory receiver, whereby the sensory receiver receives, interprets and processes the transmitted information from the controller and activates a tactual sensory (vibrator) alert and/or audible sensory alert to alert and selectably indicate to the referee that the time period is about to end or has ended. The referee's sensory receiver can also include control switches for selection of time notification regimes and also includes one or more LED displays which can display time or other such desired information, as required.

One significant aspect and feature of the present invention is a referee's wireless horn indicator system having sensory alerts including a controller and a sensory receiver.

Another significant aspect and feature of the present invention is a referee's wireless horn indicator system having sensory alerts, wherein a wireless time signal is synchronized with and sent from a controller to a sensory receiver in order to pre-alert a referee that a time period will soon end.

Another significant aspect and feature of the present invention is a referee's wireless horn indicator system having sensory alerts, wherein a wireless time signal is synchronized with and sent from a controller to a sensory receiver in order to alert a referee that a time period has ended.

Still another significant aspect and feature of the present invention is a referee's wireless horn indicator system having sensory alerts by which the referee is alerted by an audible sensory alert or a tactual vibratory alert, or both, that a time period is about to end or that a time period has ended, or both.

Yet another significant aspect and feature of the present invention is the use of an audible sensory alert which verbalizes a countdown in a spoken language, such as "five, four, three, two, one, time period over (or game over)", or in the alternative, a distinct tone indicating a time period or a game is over, for example, or the like, which corresponds to the number of seconds remaining in a time period or in a game and actual end of a time period or a game.

Yet another significant aspect and feature of the present invention is the use of an audible sensory alert which emits a countdown using tones, beeps or the like corresponding to the number of seconds remaining in a time period or in a game and/or a distinct tone to indicate the end of a time period or a game.

Yet another significant aspect and feature of the present invention is the use of a tactual sensory alert which produces vibration bursts corresponding to the number of seconds remaining in a time period or in a game and/or a distinct vibration burst to indicate the end of a time period or a game.

Yet another significant aspect and feature of the present invention is the programmability or selection of sensory information output of the sensory receiver, such as the number of seconds remaining in a time period or in a game, which can be selectingly determined by the referee.

Yet another significant aspect and feature of the present invention is the ability of a referee to customizingly select the type of intensity, the combination of, and the duration of audible sensory alerts and/or tactual alerts.

Yet another significant aspect and feature of the present invention is a referee's wireless horn indicator system having sensory alerts which incorporates a sensory receiver that overcomes crowd and other noise or visual interference.

A further significant aspect and feature of the present invention is referee's wireless horn indicator system having sensory alerts, wherein a vibratory sensory alert or an auditory sensory alert, or both, may be used to robustly indicate the end of a time period.

Having thus briefly described embodiments, as well as significant aspects and features, of the present invention, it is the principal object of the present invention to provide a referee's wireless horn indicator system having sensory alerts.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

The single FIGURE illustrates a referee's wireless horn indicator system having sensory alerts, the present invention.

DETAILED DESCRIPTION OF THE PREFERRED EMBODIMENTS

Figure 1:
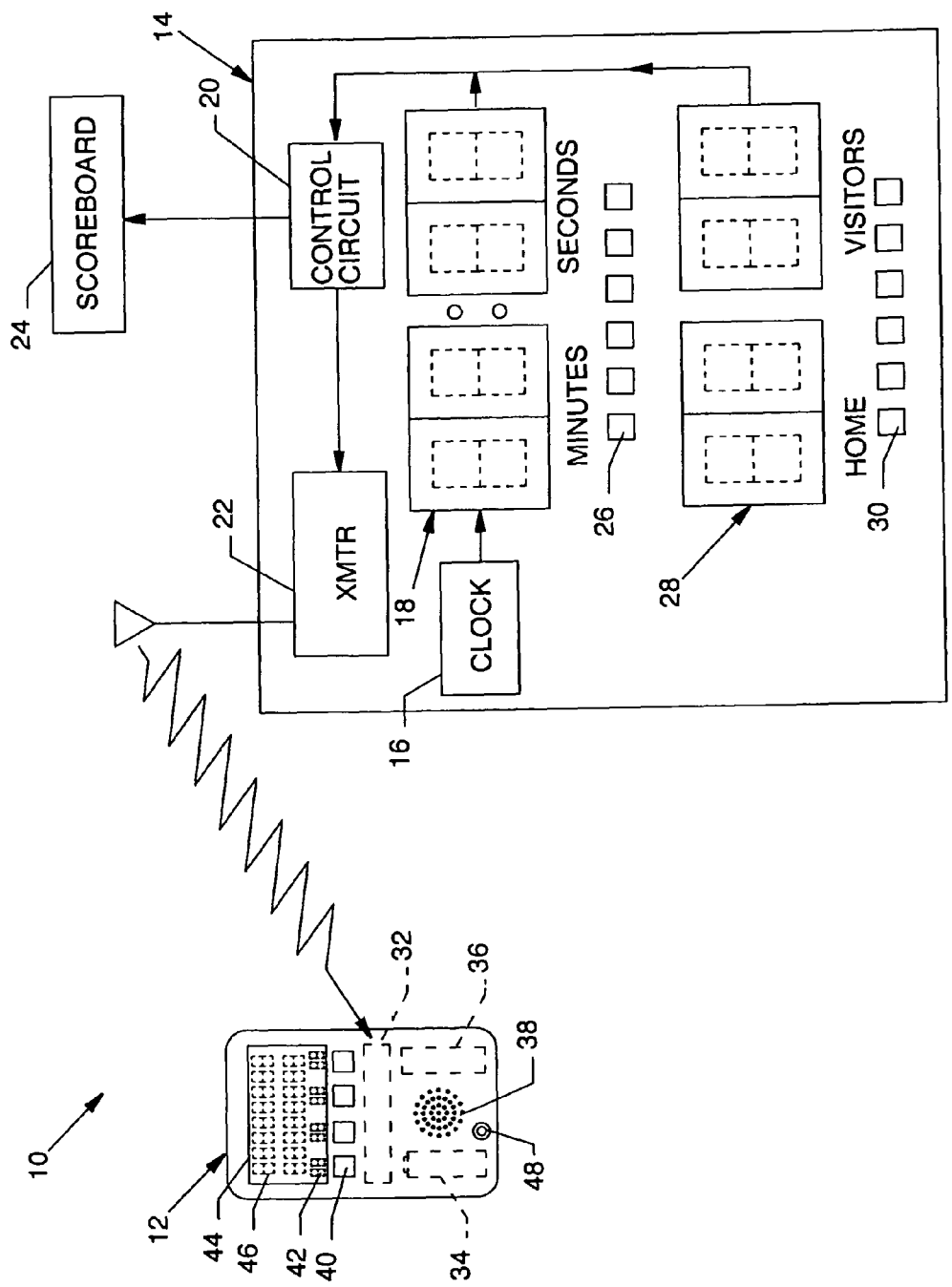

The single drawing FIG. 1 illustrates a plan view of the referee's wireless horn indicator system having sensory alerts 10, the present invention, the major components of which include a sensory receiver 12 and a controller 14. The controller 14 includes a clock 16, which may be digital, having an alpha-numeric digital light emitting diode (LED) or other suitable time display 18 which is inputted to a control circuit 20. The control circuit 20 senses essential clock running information and the time period ending and other time information with reference to the clock 16 and/or display 18 and incorporates a transmitter 22 to transmit a digital or other signal to the sensory receiver 12. Optionally, the control circuit 20 can send timing information to an external scoreboard 24, if desired. A row of control switches 26 provides for simultaneous control of the clock 16 and time display 18 such as, but not limited to, starting, stopping and resetting of the clock 16 and time display 18. An optional alpha-numeric digital light emitting diode (LED) or other suitable score display 28 and optional row of control switches 30 is provided to control sending of scoring information to the scoreboard 24 or sensory receiver 12 via the control circuit 20 and transmitter 22, as required.

The sensory receiver 12 includes a radio receiver 32 for receiving signals from the transmitter 22 of the controller 14. The sensory receiver 12 and the components contained therein are powered by one or more batteries 34. Sensory alerting devices include a piezoelectronic speaker 38 and vibrator 36 and are selectably activated upon reception and interpretation by the radio receiver 32 of an appropriate signal from the controller 14. Sensory alerts can be provided in several ways. The vibrator 36 provides a tactual sensory alert in the form of a countdown vibration series and distinct time period or game over vibration which can be used by itself or which can be used in concert with and to supplement the auditory sensing alerts from the piezoelectronic speaker 38. Additionally, the piezoelectronic speaker 38 provides an audible sensory alert in the form of verbalized countdown and time period or game ending iteration or in the form of a series of countdown tones or beeps or the like to iterate the time period or game ending which can be used by itself or which can be used in concert with and to supplement the tactual sensory alert from the vibrator 36. A row of control switches 40 can be used to select or configure the desired audible or tactual sensory alert. The control switches 40 can also be used to control other functions of the sensory receiver, such as strength of the vibrator 36 or the volume of the piezoelectronic speaker 38. The settings of the control switches 40 can also be annunciated by characters or icons 42 found in the lower region of a display window 44 which can contain LED or other suitable alpha-numeric readouts. One or more rows 46 of time or scoring or other desirable information can be included in the upper region of the display window 44. An earphone jack 48 can be provided for use with a referee's earphone.

MODE OF OPERATION

Operation of the sensory receiver 12 of the invention by the referee utilizes communication of time information transmitted by components of the controller 14 to the sensory receiver 12. Such transmitted time information includes information relating to the status of the clock 16 of the controller 14 including, but not limited to, active live running clock information, stopped clock information and end of time period or end of game information, all of which is received, interpreted and otherwise utilized by the radio receiver 32 and components of the sensory radio 12 in order to initiate audible sensory alerts and/or tactual sensory alerts which are perceived by and used by the referee. The referee can use the control switches 40 and the characters or icons 42 in the display window 44 to select, customize and monitor the mode of operation of the sensory receiver 12 in order to utilize one or more sensory alert regimes. The time information transmitted by components of the controller 14 and received the radio receiver 12 in the sensory receiver 32 is utilized according to the selection and customizing of preferences determined during the selection and customizing of the sensory alert regimes by the referee.

One sensory alert regime is that which involves an audible sensory alert through the piezoelectronic speaker 38 which verbalizes a countdown in a spoken language, such as "five, four, three, two, one, time period (or game) over", for example, or the like, which corresponds to and indicates the number of seconds remaining in a time period or in a game and the actual end of the time period or game.

One sensory alert regime is that which involves an audible sensory alert through the piezoelectronic speaker 38 which verbalizes a countdown in a spoken language and a distinct tone indicating a time period or a game is over, such as "five, four, three, two, one" [distinct tone], for example, or the like, which corresponds to and indicates the number of seconds remaining in a time period or in a game and the actual end of the time period or game.

One sensory alert regime is that which involves an audible sensory alert through the piezoelectronic speaker 38 which verbalizes a time period or game is over, for example, or the like, which corresponds to and indicates the actual end of the time period or game.

One sensory alert regime is that which involves an audible sensory alert through the piezoelectronic speaker 38 which uses a distinct tone indicating a time period or game is over, such as a [distinct tone], for example, or the like, which corresponds to and indicates the actual end of the time period or game.

One sensory alert regime is that which involves an audible sensory alert through the piezoelectronic speaker 38 which emits a countdown using tones, beeps and distinct tone indicating a time period or game is over, such as five beeps or tones and a [distinct tone], for example, or the like, which corresponds to and indicates the number of seconds remaining in a time period or a game and the actual end of the time period or game.

One sensory alert regime is that which involves a tactual sensory alert using the vibrator 36 which emits a countdown using vibration bursts and a distinct vibration burst indicating a time period or game is over, such as five vibration bursts and a [distinct vibration burst], for example, or the like, which corresponds to and indicates the number of seconds remaining in a time period or a game and the actual end of the time period or game.

One sensory alert regime is that which involves a tactual sensory alert using the vibrator 36 which emits a distinct vibration burst indicating a time period or game is over, such as a [distinct vibration burst], for example, or the like, which corresponds to and indicates the actual end of the time period or game.

Combinations of the above regimes can also be selectable and configurable using combinations of audible sensory alerts and tactual sensory alerts, such as, but not limited to, the following regimes.

One sensory alert regime for maximum perception by a referee is that which involves an audible sensory alert through the piezoelectronic speaker 38 which verbalizes a countdown in a spoken language, such as "five, four, three, two, one, time period (or game) over" combined with a simultaneous countdown using vibration bursts and a distinct vibration burst indicating a time period or game is over, such as five vibration bursts and a [distinct vibration burst], for example, or the like, of which in each example corresponds to and indicates the number of seconds remaining in a time period or game and the actual end of the time period or game.

One sensory alert regime for maximum perception by a referee is that which involves an audible sensory alert through the piezoelectronic speaker 38 which emits a countdown using tones, beeps and distinct tones indicating a time period or game is over, such as five beeps or tones and a [distinct tone] combined with a simultaneous countdown using vibration bursts and a distinct vibration burst indicating a time period or game is over, such as five vibration bursts and a [distinct vibration burst], for example, or the like, of which in each example corresponds to and indicates the number of seconds remaining in a time period or game and the actual end of the time period or game.

Clearly, numerous combinations using variations on the previously described sensory alert regimes are possible within the teachings of the invention. In addition, the countdown time and duration of any type of non-verbal countdown, such as an audible sensory alert beep or tone, or a tactual sensory alert, is selectable, configurable and customizable by the referee. The verbalized countdown time in an audible sensory alert is selectable, configurable and customizable by the referee.

Various modifications can be made to the present invention without departing from the apparent scope thereof.

PARTS LIST

10 referee's wireless horn indicator system having sensory alerts
12 sensory receiver
14 controller
16 clock
18 time display
20 control circuit
22 transmitter
24 scoreboard
26 switches
28 score display
30 control switches
32 radio receiver
34 battery
36 vibrator
38 piezoelectronic speaker
40 control switches
42 characters or icons
44 display window
46 rows
48 earphone jack It is claimed:

1. A process for informing a referee officiating a timed event of one or more event time information occurrences comprising:
    providing a controller including an event clock with event time information, a time display, and a signal transmitter that interfaces with the event clock via a control circuit;
    providing a wireless sensory receiver that is wearable by the referee and operable to receive time information signals from the controller via the transmitter, the sensory receiver including:
        a radio receiver for receiving signals from the transmitter;
        a battery power source;
        a vibrator device for providing a tactual sensory alert in the form of a countdown series of vibration bursts;
        a speaker device for providing an audible sensory alert in the form of a countdown series of audible queues; and
        a plurality of control switches operable for selecting characteristics of the tactual and audible sensory alerts;
    creating a customized sensory alert comprising a desired tactual sensory alert and/or a desired audible sensory alert using the control switches, wherein the desired tactual sensory alert includes a user selected vibratory strength and type of vibration burst, and wherein the desired audible sensory alert includes a user selected audible volume and type of audible queue; and
    prior to or upon the event clock reaching a zero time reading, transmitting one or more signals to the sensory receiver, whereby the sensory receiver receives, interprets, and processes the one or more signals from the controller and activates the vibrator device and/or the speaker device to alert and selectably indicate to the referee that the time period is about to end or has ended.

2. The process of claim 1, wherein:
    the control switches are operable for selecting time notification regimes including a countdown period for the tactual sensory alert and/or a countdown period for the audible sensory alert.

3. The process of claim 1, wherein the sensory receiver further comprises a display window for displaying selected characteristics of the tactual and/or audible sensory alerts.

4. The process of claim 3, wherein the display window of the sensory receiver further displays information from the controller selected from the group consisting of score and event time information.

5. The process of claim 4, wherein the display window displays alpha-numeric information.

6. The process of claim 5, wherein the alpha-numeric information is conveyed by LEDs.

7. The process of claim 1, further comprising the step of providing a scoreboard that interfaces with the event clock via the control circuit in the controller.

8. The process of claim 1, wherein the audible queues comprise spoken language.

9. The process of claim 1, wherein the audible queues comprise audible tones.

10. The process of claim 1, wherein the audible queues comprise audible beeps.

11. The process of claim 1, wherein the sensory receiver further comprises an audio output receptacle that is operable to transmit the audible sensory alert to the referee through an earphone connected to the receptacle.

12. The process of claim 1, wherein the speaker device is a piezoelectric speaker.

13. A wireless indicator system for informing a referee of one or more event time information occurrences comprising:

a controller including an event clock with event time information, a time display, and a signal transmitter that interfaces with the event clock via a control circuit; and a wireless sensory receiver that is wearable by the referee and operable to receive time information signals from the controller via the transmitter, the sensory receiver including:

a radio receiver for receiving signals from the transmitter;

a battery power source;

a vibrator device for providing a tactual sensory alert in the form of a countdown series of vibration bursts;

a speaker device for providing an audible sensory alert in the form of a countdown series of audible queues; and a plurality of control switches operable for selecting characteristics of the tactual and audible sensory alerts to create a customized sensory alert comprising a desired tactual sensory alert and/or a desired audible sensory alert, the desired tactual sensory alert including a user selected vibratory strength and type of vibration burst, and the desired audible sensory alert including a user selected audible volume and type of audible queue;

wherein the controller is operable such that prior to or upon the event clock reaching a zero time reading, one or more signals are transmitted to the sensory receiver, whereby the sensory receiver receives, interprets, and processes the one or more signals from the controller and activates the vibrator device and/or the speaker device to alert and selectably indicate to the referee that the time period is about to end or has ended.

* * * * *